(12) United States Patent
Buescher

(10) Patent No.: US 12,429,100 B1
(45) Date of Patent: Sep. 30, 2025

(54) ELECTRIC BRAKE ASSEMBLY FOR ELECTRIC DRIVES

(71) Applicant: Hydro-Gear Limited Partnership, Sullivan, IL (US)

(72) Inventor: Ryan S. Buescher, Neoga, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 687 days.

(21) Appl. No.: 17/658,171

(22) Filed: Apr. 6, 2022

Related U.S. Application Data

(60) Provisional application No. 63/191,556, filed on May 21, 2021.

(51) Int. Cl.
| | |
|---|---|
| *H02K 7/102* | (2006.01) |
| *F16D 55/226* | (2006.01) |
| *F16D 65/00* | (2006.01) |
| *F16D 65/12* | (2006.01) |
| *B60K 7/00* | (2006.01) |

(Continued)

(52) U.S. Cl.
CPC ....... *F16D 55/226* (2013.01); *F16D 65/0006* (2013.01); *F16D 65/121* (2013.01); *F16D 65/122* (2013.01); *F16D 65/125* (2013.01); *B60K 7/0007* (2013.01); *B60K 2007/0092* (2013.01); *B60T 1/065* (2013.01); *B60T 13/743* (2013.01); *F16D 2065/1312* (2013.01); *F16D 2065/1324* (2013.01); *F16D 65/44* (2013.01); *F16D 2121/22* (2013.01); *F16D 2200/0021* (2013.01); *F16D 2200/0034* (2013.01)

(58) Field of Classification Search
CPC .. F16D 55/226; F16D 65/0006; F16D 65/121; F16D 65/122; F16D 65/125; F16D 65/44; F16D 2065/1312; F16D 2065/1324; F16D 2121/22; F16D 2200/0021; F16D 2200/0034; B60K 7/0007; B60K 2007/0092; B60T 1/065; B60T 13/743
USPC .......... 188/171, 173; 192/12 D, 84.1, 84.31, 192/217.7; 310/77, 93, 100, 103, 109
See application file for complete search history.

(56) References Cited

U.S. PATENT DOCUMENTS

| | | |
|---|---|---|
| 2,536,491 A | 1/1951 | Chapman et al. |
| 3,668,445 A | 6/1972 | Grove |

(Continued)

OTHER PUBLICATIONS

Martin, "Improved Electromagnetic Brake," NASA Tech Briefs, Apr. 2004, 2 pp.

*Primary Examiner* — Christopher P Schwartz
(74) *Attorney, Agent, or Firm* — Neal, Gerber & Eisenberg LLP

(57) ABSTRACT

An electric brake for an electric drive includes a brake coil housing joined to an electric motor end cap to form a brake compartment containing a first and second stator with a rotor assembly disposed between the two stators. The rotor assembly comprises isolators for vibration damping and alignment of brake pucks constrained by and rotating along with a rotor engaged to an output shaft of the electric motor. An adjustable plug, a spacer and a spring are disposed in the brake coil housing. The spring is compressed by the adjustable plug to apply a biasing force against the second stator to press the stator against the brake pucks of the rotor assembly, and an electric brake coil is positioned adjacent to the second stator to electromagnetically pull the second stator away from the pair of brake pucks when energized.

21 Claims, 7 Drawing Sheets

(51) Int. Cl.
  *B60T 1/06* (2006.01)
  *B60T 13/74* (2006.01)
  *F16D 65/02* (2006.01)
  *F16D 65/44* (2006.01)
  *F16D 121/22* (2012.01)

(56) References Cited

U.S. PATENT DOCUMENTS

| | | |
|---|---|---|
| 3,763,968 A | 10/1973 | Noly |
| 4,172,242 A | 10/1979 | Myers et al. |
| 5,057,728 A | 10/1991 | Dammeyer et al. |
| 5,186,287 A * | 2/1993 | Lindner .............. F16D 65/0006 188/72.3 |
| 6,155,386 A * | 12/2000 | Hirai .................. F16D 65/0006 188/161 |
| 11,211,844 B1 | 12/2021 | Bonny et al. |
| 2014/0333120 A1 | 11/2014 | Pozzo |
| 2022/0178421 A1 * | 6/2022 | Bouche .................... F16D 3/48 |

* cited by examiner

ELECTRIC BRAKE ASSEMBLY FOR ELECTRIC DRIVES

CROSS-REFERENCE

This application claims priority to U.S. Provisional Application No. 63/191,556, filed on May 21, 2021, the contents of which are incorporated herein by reference in their entirety.

BACKGROUND

This application relates to an electric brake assembly having a rotor that can be driven by an output shaft of an electric motor of various electric drives. Such a drive may be used for applications such as ground drives for riding lawnmowers or mobile equipment such as a mobile work platform or a boom lift, among other applications.

SUMMARY

A light weight, quiet operation, low cost electric brake for an electric drive is disclosed herein. The electric brake includes joined and sealed housing components enclosing a brake compartment containing a first stator, which may be an inner stator, and a second stator, which may be an outer stator, with a rotor assembly disposed between the two stators. A first embodiment of the rotor assembly comprises a pair of isolators for vibration damping and alignment of a pair of brake pucks that are constrained by and rotate along with a rotor of the rotor assembly. A second, similar embodiment of the rotor assembly comprises three isolators and corresponding brake pucks. The rotor is engaged to an output shaft of an electric motor of a compatible electric drive unit. An adjustable plug is disposed in an opening in an end cap of the electric brake, adjacent to a spring that is compressed by the adjustable plug, to apply a biasing force to the second stator to press the second stator against the brake pucks of the rotor assembly. An electric brake coil is positioned concentrically about the adjustable plug in the end cap and adjacent to the second stator to electromagnetically pull the second stator away from the pair of brake pucks when energized. A vibration damper is positioned adjacent to the outer circumference of the stators to further reduce vibration and noise. As used herein, the terms "isolator" and "damper" may be used interchangeably. The isolators and dampers disclosed herein are preferably composed of an elastomeric material capable of absorbing vibration.

A better understanding of the disclosure herein will be obtained from the following detailed description and accompanying drawings.

DETAILED DESCRIPTION OF THE DRAWINGS

The description that follows describes, illustrates and exemplifies one or more embodiments in accordance with its principles. This description is not provided to limit the disclosure to the embodiment(s) described herein, but rather to explain and teach the principles of the invention(s) disclosed herein in order to enable one of ordinary skill in the art to understand these principles and, with that understanding, be able to apply them to practice not only the embodiment(s) described herein, but also any other embodiment that may come to mind in accordance with these principles. The scope of the disclosure is intended to cover all such embodiments that may fall within the scope of the appended claims, either literally or under the doctrine of equivalents.

It should be noted that the drawings set forth herein are not necessarily drawn to scale, and in some instances proportions may have been exaggerated to more clearly depict certain features. As stated above, this specification is intended to be taken as a whole and interpreted in accordance with the principles of the invention(s) as taught herein and understood by one of ordinary skill in the art.

Figure 1:
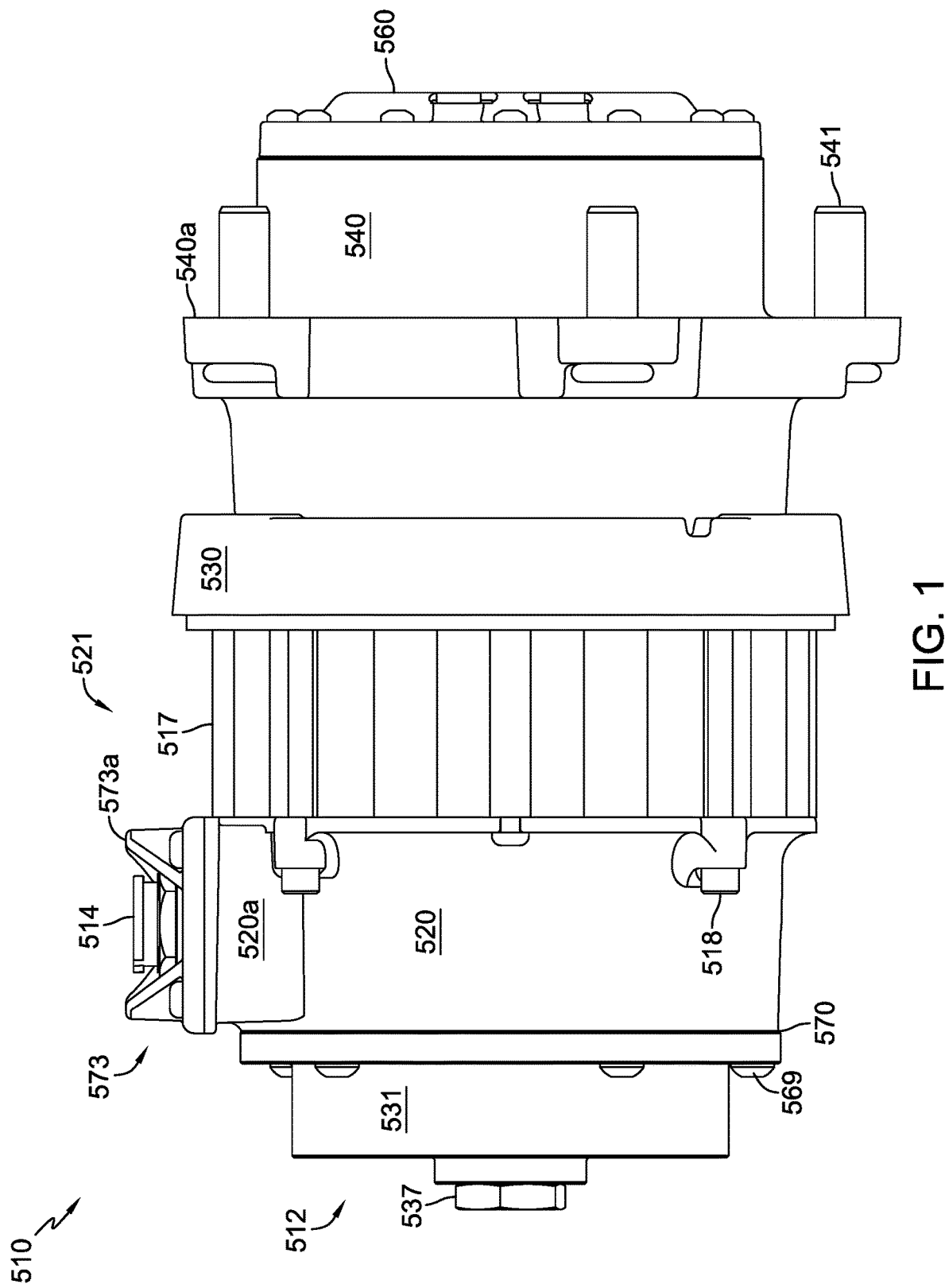
FIG. 1 is an external elevational view of a representative electric drive including an electric brake assembly in accordance with the disclosure herein.

A representative electric drive 510 including an electric brake assembly 512 is shown in FIG. 1. It should be noted that electric brake assembly 512 can be applied to any suitable drive including, but not limited to, electric ground drives used to propel zero turn mowers. As illustrated in FIG. 1, a main housing 530 is joined to an electric motor end cap 520 via fasteners 518, with a motor stator housing 517 interposed between main housing 530 and motor end cap 520. The electric brake assembly 512 includes and is partially housed within a brake coil housing 531 (also referred to as a "brake end cap" or "brake cover"). Brake coil housing 531 is attached to the motor end cap 520 by means of fasteners 569 to form a brake housing compartment sealed by a brake cover gasket 570.

Also shown in FIG. 1, an electrical connector 514 is attached or mounted to an electrical compartment cover 573, which is secured to an electrical compartment 520*a* that is integrally formed on the motor end cap 520. The environmentally sealed electrical connector 514 may include motor power phase terminals, brake coil terminals and motor control terminals, and may be configured for connection to a vehicle control system. The electrical compartment cover 573 includes connector guards 573*a* that extend beyond the sealed electrical connector 514 to protect electrical connector 514.

Main housing 530 includes mounting holes to attach electric drive 510 to a frame structure such as a vehicle frame. Output hub 540 is supported on a spindle formed on main housing 530 and contains the reduction gears of electric drive 510. Output hub 540 includes standard wheel mounting fasteners 541 and a wheel mounting flange 540*a* such that output hub 540 can serve as a wheel hub. A hub cap or gear cover 560 is attached to output hub 540 to cover the reduction gears and seal them, preferably in a lubricant bath, within output hub 540. A similar electric drive is illustrated and described in more detail in commonly-owned U.S. Pat. No. 11,211,844, which is incorporated by reference herein in its entirety.

As shown in FIGS. 1-6, brake assembly 512 comprises a brake rotor assembly 513 disposed in the brake housing compartment. Brake rotor 526 preferably comprises a center portion (or hub) 526d and a pair of arms 526e extending outwardly from opposite sides of hub 526d to create what may be referred to as a "bow tie" shape. Each arm 526e has a slot formed therein, with each slot comprising an isolator portion, or isolator slot 526b, and a puck portion, or brake puck slot 526c. Each respective isolator portion is located between the center portion and the respective puck portion. In the depicted embodiment, the isolator slot 526b and brake puck slot 526c are formed as part of a unitary slot.

Figure 2:
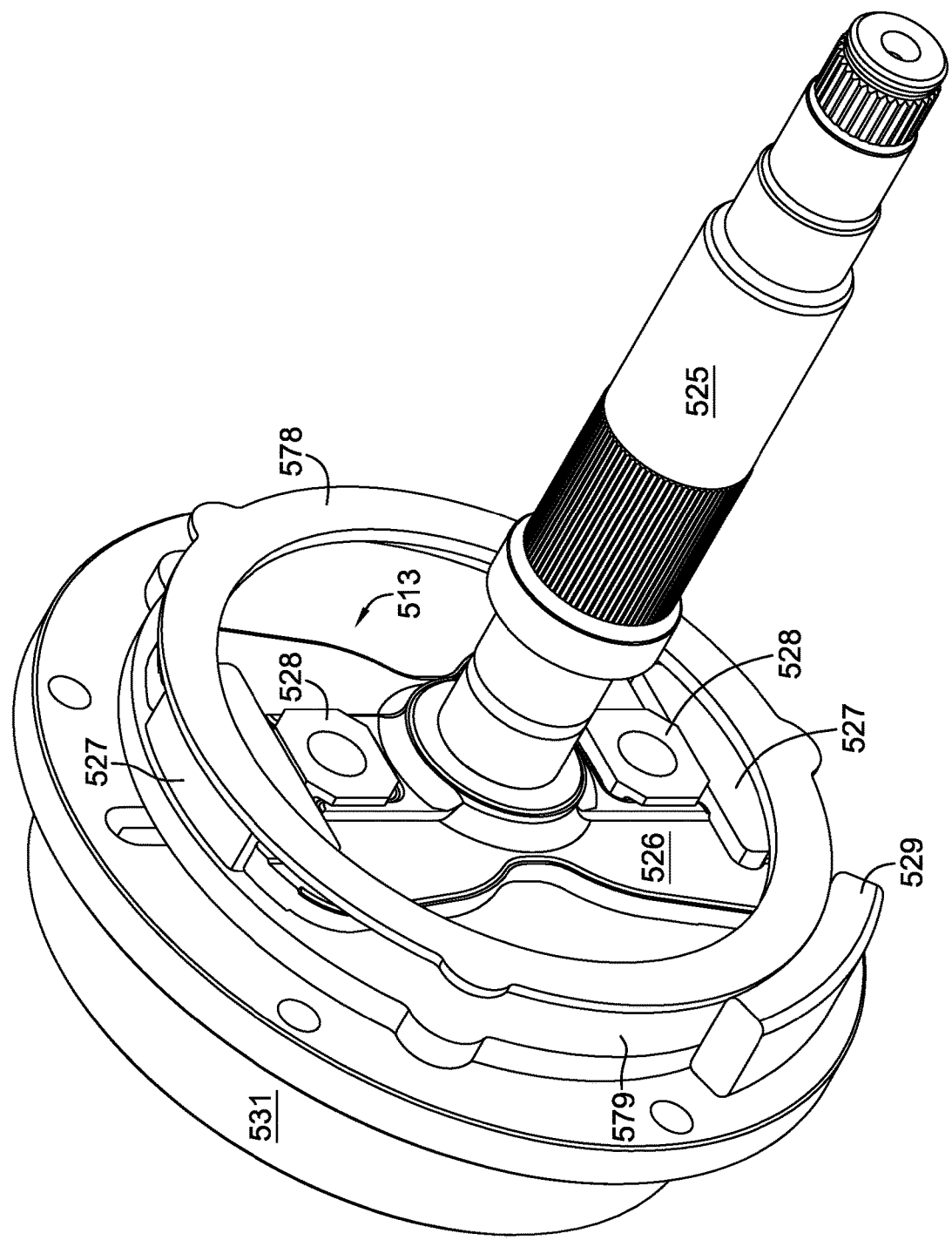
FIG. 2 is a perspective view of the electric brake assembly of FIG. 1, with a brake housing removed for clarity.
Figure 3:
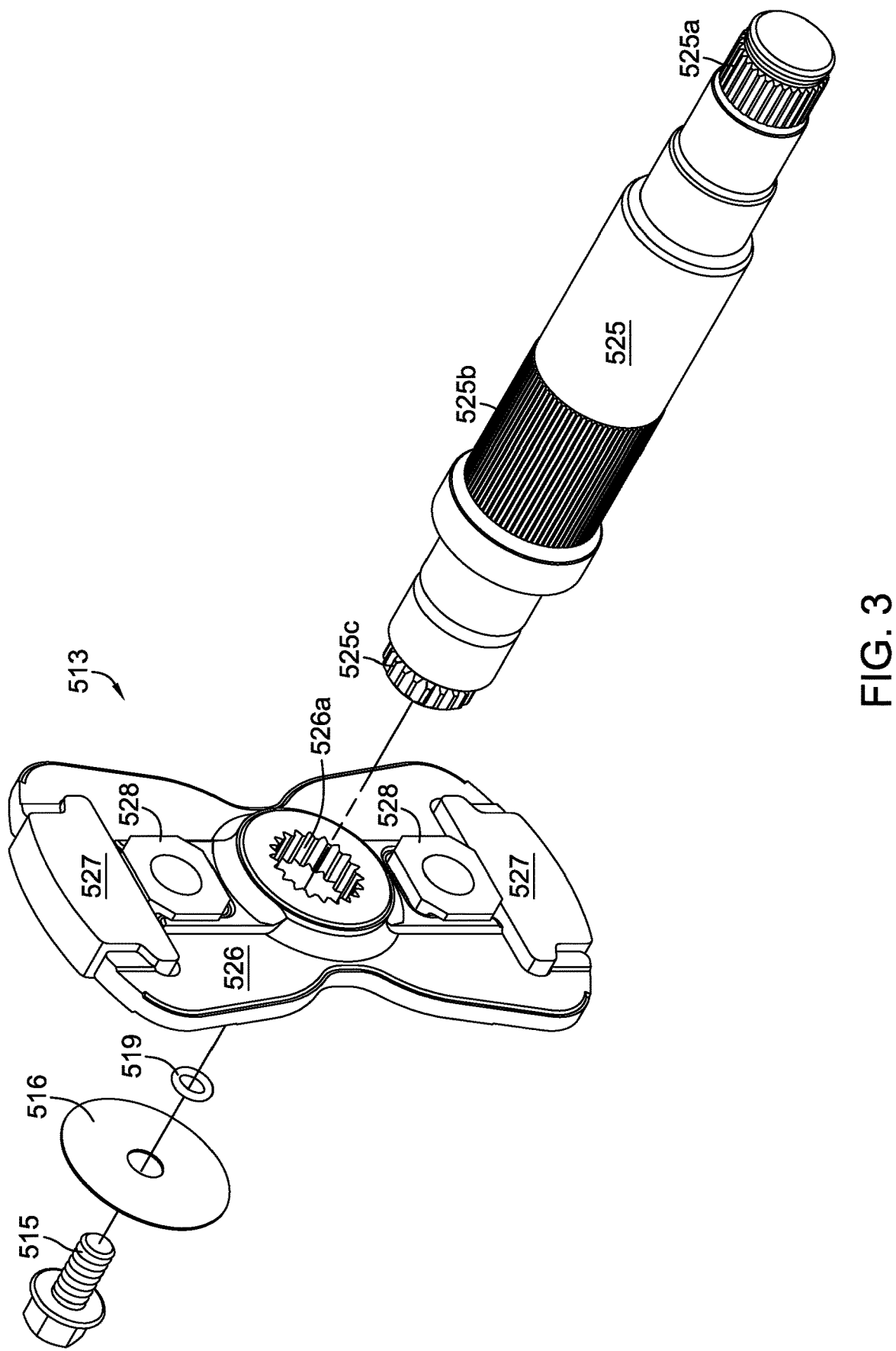
FIG. 3 is an exploded perspective view of certain components of the electric brake assembly of FIG. 2.
Figure 4:
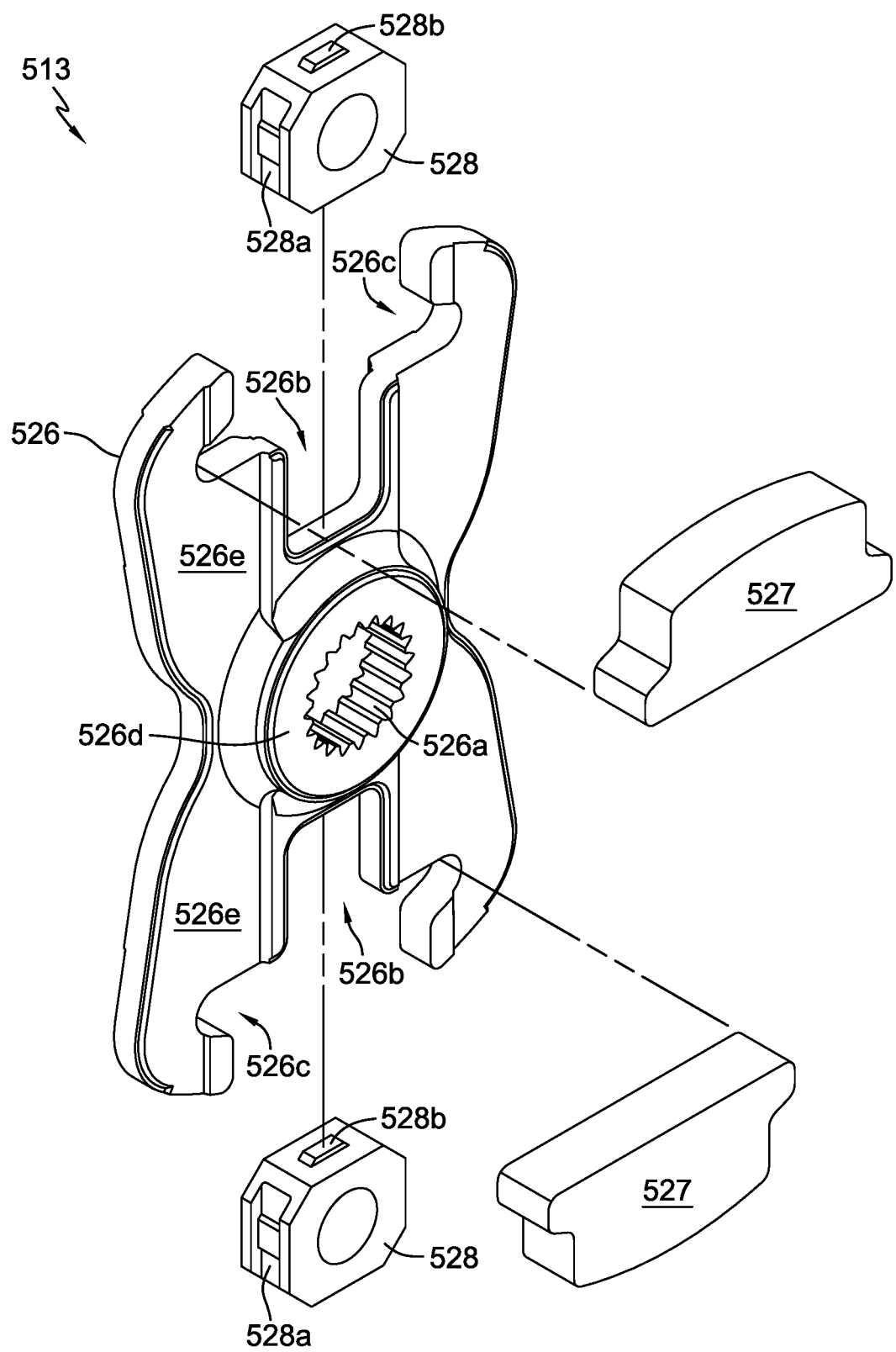
FIG. 4 is an exploded perspective view of the rotor assembly of the electric brake assembly of FIG. 2.

As illustrated in FIGS. 2-4, brake rotor assembly 513 includes a pair of symmetrical puck isolators 528 that are slidingly installed into the pair of isolator slots 526b, with each isolator slot 526b being formed in one of the arms 526e of brake rotor 526. A pair of grooves 528a is formed on opposing sides of each puck isolator 528 to engage opposing edges of each isolator slot 526b. Brake rotor 526 preferably comprises a non-magnetic stainless steel material such as SS-316N1-25 (reference MPIF Standard 35, ASTM B783, etc.) or other non-magnetic material such as aluminum. A pair of brake pucks 527 is subsequently installed in a pair of brake puck slots 526c formed in brake rotor 526 adjacent to the pair of isolator slots 526b, thereby securing the puck isolators 528 in place and in contact with the brake pucks 527. Brake pucks 527 are preferably comprised of a non-asbestos friction material (such as glass-filled phenolic resin Durez 32633 available from Sumitomo Bakelite North America, Inc., for example), Such a material provides wear characteristics that are comparable to those of standard brake materials, but also provide significantly higher strength characteristics than other materials. For example, the tensile strength of such a glass-filled phenolic material is significantly higher, and such increased strength is beneficial due to the stresses that may be transferred from brake rotor 526 to brake pucks 527 during braking. When the brake pucks 527 are installed, one of a pair of brake puck alignment projections 528b formed on opposing sides of each puck isolator 528 bears against each brake puck 527 to prevent or significantly reduce vibration and noise. The location of brake puck alignment projections 528b, in conjunction with controlled draft surfaces of brake puck 527, ensures proper alignment of brake pucks 527 in relation to adjacent stator surfaces in order to reduce wear. And, since the isolators 528 bear against and retain brake pucks 527 in brake puck slots 526c, brake rotor assembly 513 can be preassembled. As shown in FIG. 3, the brake rotor 526 of brake rotor assembly 513 has internal splines 526a that are slidingly engaged to external splines 525c of an exemplary electric motor output shaft 525. A threaded fastener 515 and a washer 516 are then used to secure the brake rotor 526 to the electric motor output shaft 525. An O-ring 519 may be used to retain the washer 516 on threaded fastener 515 so these three components can be preassembled. As illustrated, exemplary motor output shaft 525 may also include splines 525a for engagingly mounting a gear (such as a sun gear or a pinion gear) to drive a reduction gear set, and splines 525b for engaging the rotor of an electric motor of a drive such as the representative electric drive 510 depicted in FIG. 1. While two arms 526e and corresponding slots are depicted in this embodiment, it will be understood that additional arms and corresponding isolators 528 and corresponding brake pucks 527 could be incorporated into rotors having a different shape within the scope of this disclosure. For example, the rotor assembly may comprise three or more equally spaced arms or lobes with corresponding isolators and brake pucks.

Figure 7:
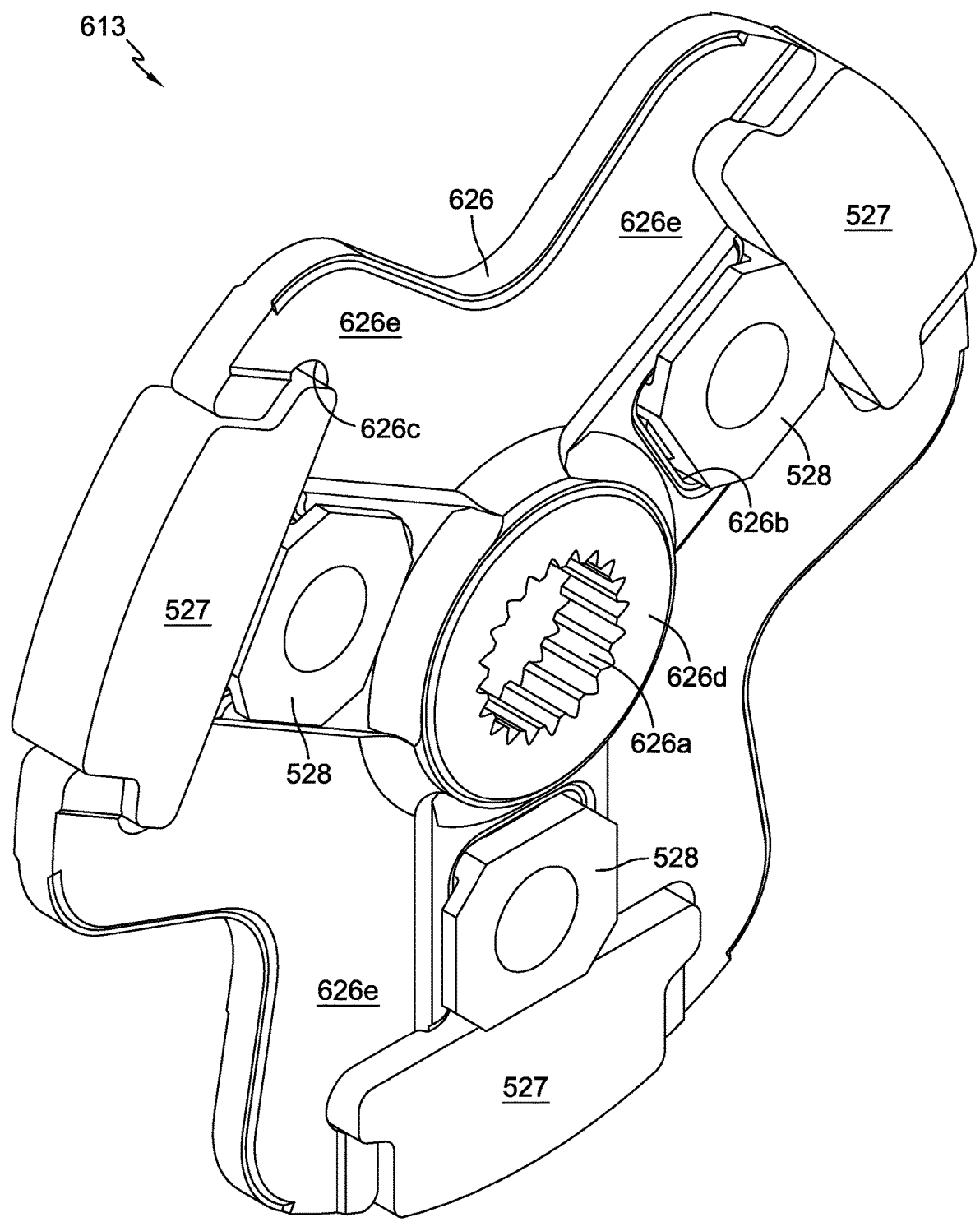
FIG. 7 is a perspective view of a second embodiment of a rotor assembly that may be interchangeable with the rotor assembly of the electric brake assembly of FIG. 2.

A second embodiment of a brake rotor assembly 613 having a rotor 626 with three arms (or lobes) 626e equally spaced about a center portion or hub 626d having splines 626a formed therein is depicted in FIG. 7. Brake rotor assembly 613 may be interchangeable with brake rotor assembly 513 and may comprise the same materials used to form the components of brake rotor assembly 513. As shown, brake rotor assembly 613 includes three isolators 528 and three brake pucks 527 retained in three unitary slots formed in the three lobes 626e of rotor 626 and comprising three isolator slots 626b and three brake puck slots 626c.

It will be understood that the components of the rotor assemblies illustrated herein (and rotor assemblies of similar form but not illustrated herein, such as a four-lobed rotor assembly) may comprise materials as described herein or other appropriate materials and dimensions suitable to different drive applications with different braking performance requirements.

Figure 6:
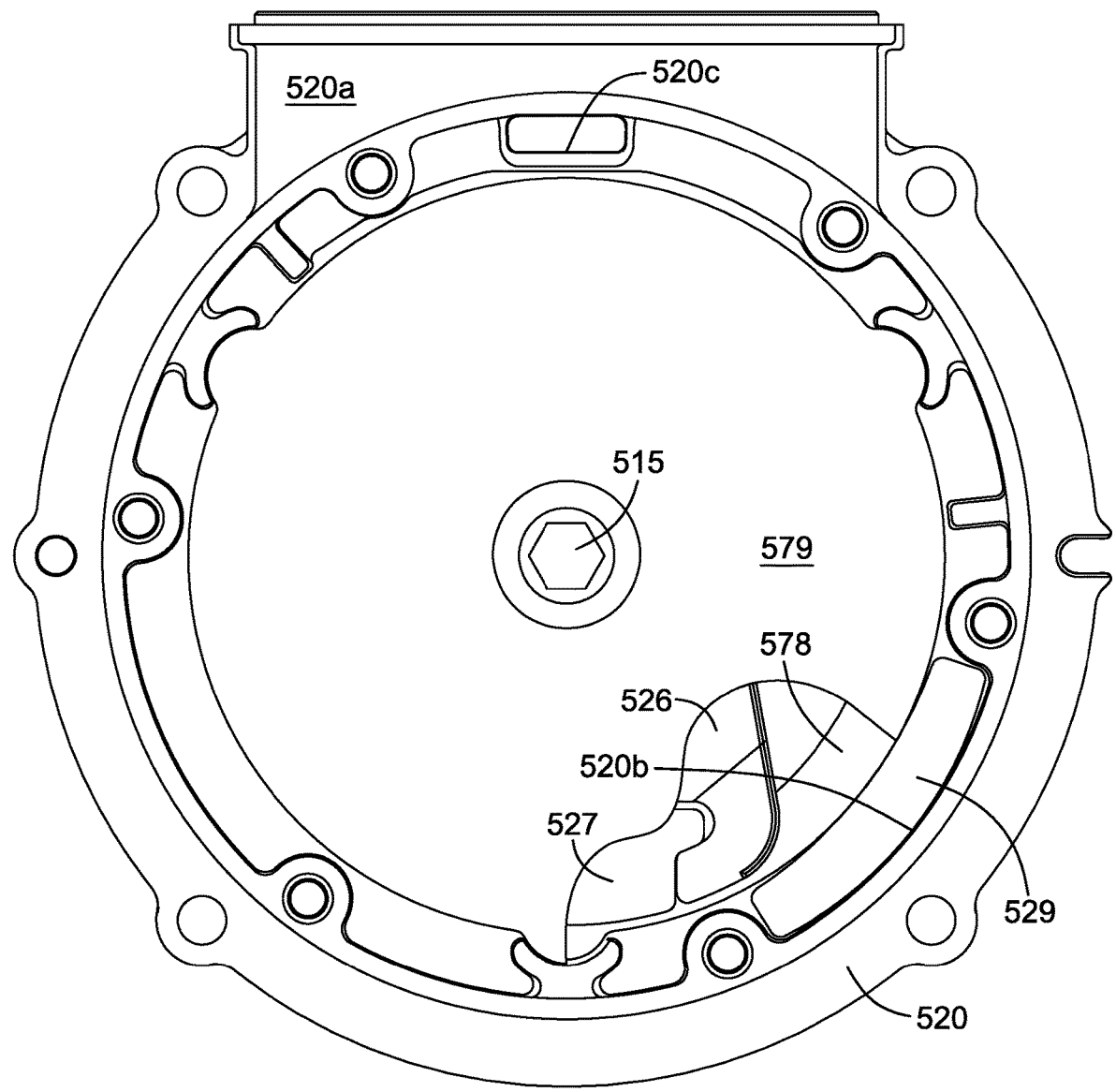
FIG. 6 is an elevational end view of selected components of the electric drive of FIG. 1, including a vibration damper.

The brake rotor assembly 513 is positioned between a first stator 578 and a second stator 579 within the brake housing compartment. As shown in FIG. 6, a stator isolator or damper 529 may also be positioned in the housing compartment such that it bears against an inner surface of the housing compartment, and more specifically against an inner surface 520b of motor end cap 520 and against the outer edges of stators 578 and 579 to prevent or significantly reduce vibration and noise. Stator damper 529 may be a flat piece of rubber, for example, that is bent into a curved form at installation so that it simultaneously applies vibration damping pressure against an inner surface of motor end cap 520 and an outer edge or perimeter surface of one or both of the stators 578 and 579, as needed. Stators 578 and 579 are configured to provide a braking force to the brake rotor assembly 513 when under the influence of a biasing force imparted by compression spring 539. Stators 578 and 579 comprise a plurality of anti-rotation tabs 578a and a plurality of anti-rotation tabs 579a, respectively. The anti-rotation tabs 578a and anti-rotation tabs 579a engage mating features formed within motor end cap 520. The overall diameter (including anti-rotation tabs 578a) of the first stator 578 is less than the overall diameter (including anti-rotation tabs 579a) of the second stator 579, thereby preventing an incorrect assembly sequence of the two stators.

Figure 5:
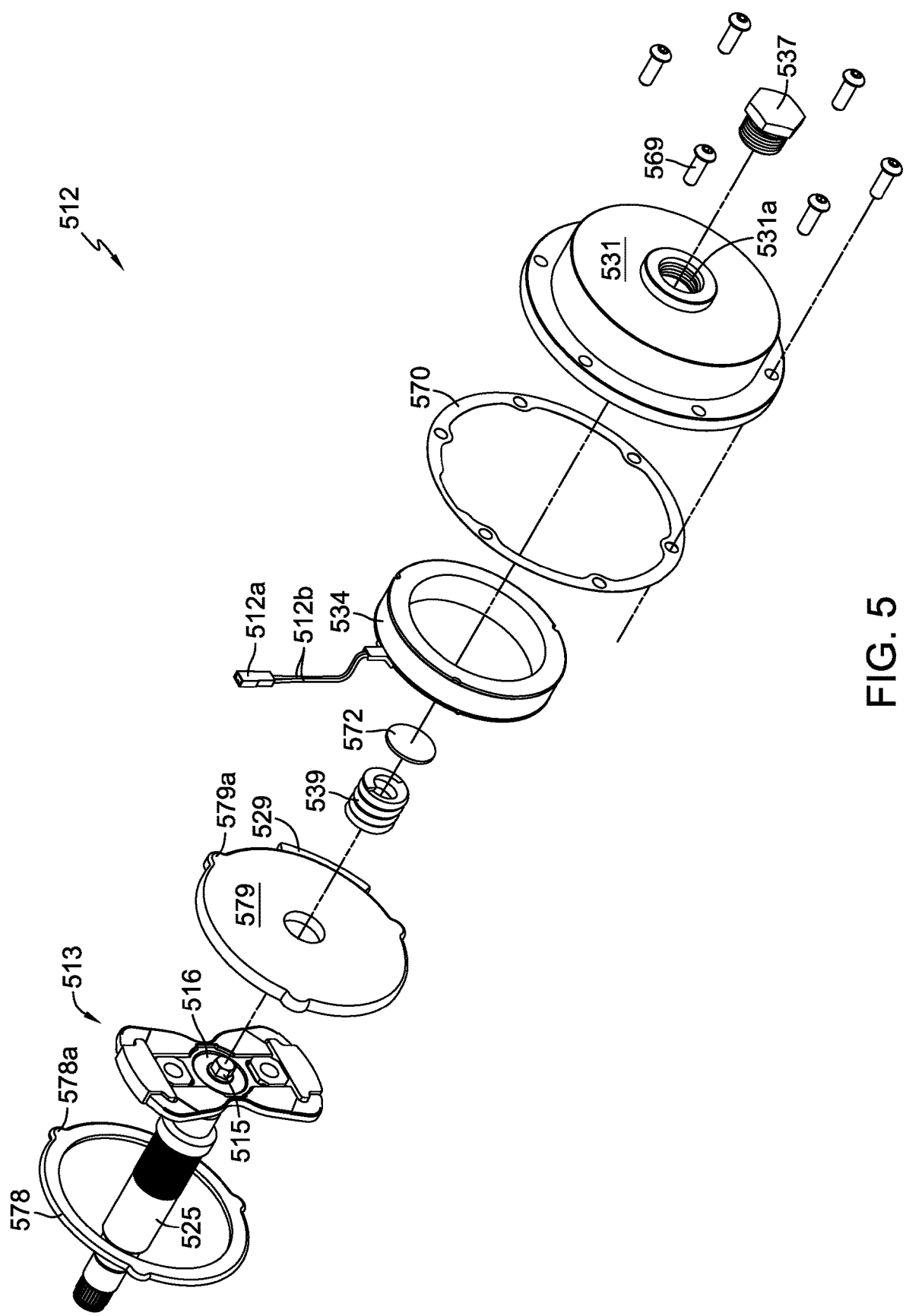
FIG. 5 is an exploded perspective view of the electric brake assembly of FIG. 2.

Referring to FIG. 5, electric brake coil 534 is positioned adjacent to the second stator 579 and is electrically joined to the electrical connector 514 shown in FIG. 1 via brake electrical conductors 512b and connector 512a. A wiring passage 520c connecting electrical compartment 520a to the brake compartment is shown in FIG. 6. The electric brake coil 534 may be disposed within a circular slot formed in the brake coil housing 531. When electric brake coil 534 is energized via conductors 512b, electric brake coil 534 removes the braking force from stators 578 and 579 by electromagnetically pulling the second stator 579 away from the brake rotor assembly 513 and against the brake coil housing 531. That is, the electric brake coil 534, when energized, applies an electromagnetic force that is greater than the spring biasing force of spring 539 to second stator 579 to release second stator 579 from bearing against the brake rotor assembly 513, or more specifically, brake pucks 527. When electric brake coil 534 is de-energized, the biasing force of compression spring 539 presses the stator/rotor stack comprising second stator 579, rotor assembly 513 and first stator 578 against an inner surface of the motor end cap 520. The first stator 578 is preferably formed of high-carbon steel to limit the amount of wear caused by the brake rotor assembly 513 and/or to prevent the electromagnetic force of the electric brake coil 534 from moving the first stator 578. The second stator 579 is preferably formed of low-carbon steel and/or is thicker than first stator 578 to facilitate axial movement of second stator 579 by the electromagnetic force.

A spacer 572 may be positioned between compression spring 539 and external brake release plug 537 to prevent abrasion damage and contamination that could otherwise be caused by unwanted rotation of spring 539 against second stator 579 when installing or adjusting external brake release plug 537 to reduce or remove the biasing force to allow rotation of output shaft 525. Brake release plug 537 is preferably an SAE plug comprising an O-ring for sealing plug aperture 531a formed in brake coil housing 531 when it is properly installed in its brake biasing/operational position. Compression spring 539 may be disposed in a cylindrical spring chamber (not shown) formed in brake coil housing 531 adjacent to aperture 531a. The spring chamber and aperture 531a are axially collinear. The diameters of spacer 572 and compression spring 539 are larger than the diameter of aperture 531a, thus preventing the loss of spacer 572 or spring 539 through aperture 531a. In the depicted embodiment, aperture 531a and plug 537 are both depicted as being threaded. When external brake release plug 537 is installed in aperture 531a and tightened, it bears against spacer 572 which bears against spring 539 which bears against and applies a biasing force to the second stator 579 to press the stator/rotor stack (comprising second stator 579, rotor assembly 513 and first stator 578) against an internal surface of motor end cap 520. The brake release plug 537 can be loosened to adjust (reduce or eliminate) the biasing force to, for example, enable a vehicle to be moved in a manual bypass mode when, for example, electrical power is unavailable.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An electric drive assembly, comprising:
 a housing forming an internal brake compartment;
 an electric motor output shaft partially disposed in the brake compartment;
 an electric brake assembly comprising:
  a first stator and a second stator disposed in the brake compartment;
  a brake rotor assembly disposed in the brake compartment between the first stator and the second stator and engaged to the electric motor output shaft, the brake rotor assembly comprising a rotor made of a non-magnetic material, a brake puck engaged to the rotor, and a brake puck isolator engaged to the rotor and contacting the brake puck;
  an adjustable plug at least partially disposed in the brake compartment;
  a spring disposed in the brake compartment and contacting the second stator and in operable engagement with the plug to provide a biasing force to the second stator;
  an electric brake coil disposed in the brake compartment concentrically about the spring and adjacent the second stator;
 wherein compression of the spring by adjustment of the plug increases the biasing force to the second stator; and
 wherein the electric brake coil is configured to move the second stator away from the rotor when the electric brake coil is energized, to remove the biasing force from the electric motor output shaft.

2. The electric drive assembly of claim 1, wherein the plug is threaded into an aperture formed in the housing to adjust the compression of the spring.

3. The electric drive assembly of claim 1, wherein the first stator is formed of high-carbon steel to limit wear caused by the brake rotor assembly and to prevent movement of the first stator when the electric brake coil is energized.

4. The electric drive assembly of claim 3, wherein the second stator is formed of low-carbon steel and is thicker than the first stator to facilitate movement of the second stator when the electric brake coil is energized.

5. The electric drive assembly of claim 1, wherein the electric brake assembly further comprises at least one stator damper positioned in the brake compartment such that it simultaneously bears against an inner surface of the housing and against an outer edge of at least one of the first and second stators.

6. The electric drive assembly of claim 1, wherein the rotor comprises a rotor body having a center portion, a first arm extending from a first side of the center portion, and a second arm extending from a second side of the center portion opposite the first side, wherein the center portion, the first arm and the second arm form a bow tie shape, a first slot formed in the first arm, and a second slot formed in the second arm.

7. The electric drive assembly of claim 6, wherein the brake puck comprises a first brake puck disposed in the first slot and a second brake puck disposed in the second slot.

8. The electric drive assembly of claim 7, wherein the brake puck isolator comprises a first elastomeric brake puck isolator disposed in the first slot and contacting the first brake puck, and a second elastomeric brake puck isolator disposed in the second slot and contacting the second brake puck.

9. An electric brake assembly for use with an electric drive having a housing, the electric brake assembly comprising:
 a first stator and a second stator each disposed within a brake compartment formed in the housing;
 a brake rotor assembly disposed within the brake compartment between the first stator and the second stator and comprising:
  a rotor body having a center portion and two opposing arms extending outwardly from the center portion to form a bow tie shape,
  a pair of slots formed in the rotor body, each slot of the pair of slots being formed in one of the two opposing arms and having an isolator portion and a puck portion, wherein each respective isolator portion is located between the center portion and the respective puck portion;
  a pair of brake pucks, each of the pair of brake pucks being disposed in a respective one of the puck portions; and
  a pair of brake puck isolators, each of the pair of brake puck isolators being disposed in a respective one of the isolator portions;

a spring disposed within the brake compartment and configured to apply a biasing force against the second stator to press the second stator against the pair of brake pucks; and an electric brake coil disposed within the housing and positioned adjacent to the second stator, the electric brake coil configured to overcome the biasing force and electromagnetically move the second stator away from the pair of brake pucks when the electric brake coil is energized.

10. The electric brake assembly of claim 9, further comprising a plug movably disposed in the housing and configured to contact the spring, wherein adjustment of the plug adjusts the biasing force against the second stator.

11. The electric brake assembly of claim 10, wherein the plug is threaded and an aperture formed in the housing is threaded to receive the plug, and the plug can be loosened to reduce the biasing force.

12. The electric brake assembly of claim 9, wherein the first stator is formed of high-carbon steel to limit wear caused by the brake rotor assembly and to prevent movement of the first stator by an electromagnetic force generated by the electric brake coil, and the second stator is formed of low-carbon steel, is thicker than the first stator, and is positioned adjacent to the electric brake coil to facilitate movement of the second stator by the electromagnetic force.

13. The electric brake assembly of claim 9, wherein each of the pair of brake puck isolators comprises a brake puck alignment portion extending from the respective brake puck isolator to engage the respective one of the pair of brake pucks.

14. The electric brake assembly of claim 9, wherein the electric brake assembly further comprises at least one elastomeric stator damper positioned in the brake compartment such that said elastomeric stator damper simultaneously bears against an inner surface of the housing and against an outer edge of at least one of the first and second stators.

15. A brake rotor assembly for an electric brake assembly, comprising:
 a rotor having a plurality of isolator slots and a plurality of brake puck slots with each brake puck slot being adjacent to one of the plurality of isolator slots;
 a plurality of brake puck isolators, each brake puck isolator disposed in a respective one of the plurality of isolator slots; and
 a plurality of brake pucks, each brake puck disposed in a respective one of the plurality of brake puck slots;
 wherein each brake puck isolator bears against one of the plurality of brake pucks to reduce vibration and noise.

16. The brake rotor assembly of claim 15, wherein the rotor is formed of a non-magnetic material.

17. The brake rotor assembly of claim 15, wherein each of the plurality of brake pucks comprises a glass-filled phenolic resin.

18. The brake rotor assembly of claim 15, wherein each of the plurality of brake puck isolators comprises a brake puck alignment portion extending from the respective brake puck isolator to bear against a respective one of the plurality of brake pucks.

19. The brake rotor assembly of claim 15, wherein the rotor further comprises a rotor body having a hub and two opposing arms extending outwardly from the hub, and each of the two opposing arms has one of the plurality of isolator slots and one of the plurality of brake puck slots formed therein.

20. The brake rotor assembly of claim 19, further comprising splines formed in the hub for engaging an output shaft of an electric motor.

21. The brake rotor assembly of claim 15, wherein the rotor further comprises a rotor body having a hub and three equally spaced lobes extending outwardly from the hub, and each of the three equally spaced lobes has one of the plurality of isolator slots and one of the plurality of brake puck slots formed therein.

* * * * *